Patented May 30, 1933

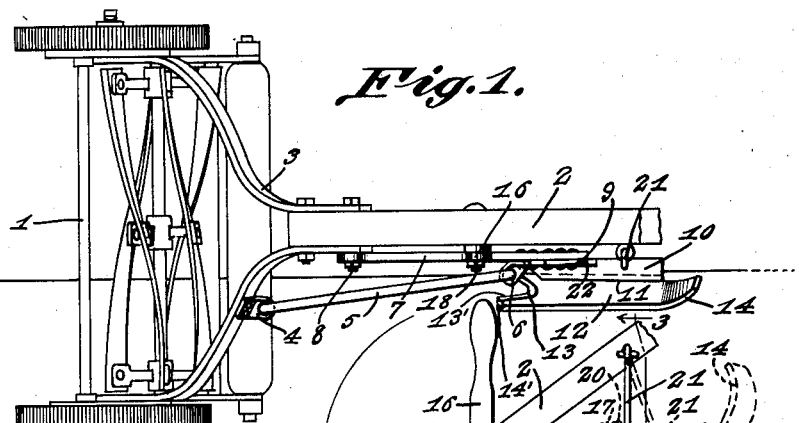

1,911,278

UNITED STATES PATENT OFFICE

SAMUEL J. HINES, OF ALEXANDRIA, LOUISIANA

LAWN MOWER ATTACHMENT

Application filed March 25, 1932. Serial No. 601,252.

This invention relates to trimmers used in trimming the edges of lawns, gardens, paths, walks and the like and the object of the invention is to provide a trimmer of this character which may be readily attached to a lawn mower and if desired remain a permanent part thereof, and which will not interfere with the mower in its ordinary work nor with the trundling of the mower to and from the work, but which when desired for use may be easily shifted to operative position and remain rigidly supported in such position.

A further object is to provide a trimmer of this character which when in use is forced through the sod at the edge of a lawn or path by the whole weight of the mower and which is balanced against lateral canting or tilting movement and the depth of the trench made by the trimmer regulated through the medium of a gage plate which is associated with the cutting blade or shovel.

To the attainment of the foregoing and many other objects which will present themselves as the nature of the invention is better understood the improvement resides in the construction, combination and operative association of parts, one satisfactory embodiment of which is disclosed by the accompanying drawing.

In the drawing:

Figure 1 is a top plan view of an ordinary lawn mower equipped with the improvement.

Figure 2 is a side elevation thereof with the trimmer in operative position.

Figure 3 is a detail sectional view approximately on the line 3—3 of Figure 2, looking in the direction of the arrows.

Figure 4 is an enlarged detail sectional view approximately on the line 4—4 of Figure 1, also looking in the direction of the arrows.

Figure 5 is an end view of the cutting blade or shovel, the gage plate and a portion of the standard to which the gage plate is attached.

In Figures 1 and 2 of the drawing the numeral 1 designates the body portion of an ordinary hand operated lawn mower, the handle of the mower being indicated by the numeral 2 and the yoke which has its ends journaled on the shaft for the mower wheels by the numeral 3.

On one side of the yoke 3 I secure the straight end of an angularly and rearwardly disposed ear 4. The ear has an opening therethrough for one of the offset ends of a brace rod 5. The second offset end of the brace rod 5 is received through an opening in an ear 6 which is bolted or otherwise rigidly fixed to a flat plate that affords a standard 7. The standard is pivoted, as at 8, to one side of the handle 2 and preferably one of the bolts that connect the yoke to the handle affords the said pivot bolt. The lower end of the standard 7 has riveted thereto a plate or metal strip 9 that has a right-angularly disposed offset end 10 that forms the gage and from the outer end of the gage plate there is a depending flange 11 that is rigidly fixed or integrally formed with the inner edge of an angularly disposed elongated shovel or cutter blade 12. The blade 12 has its forward end, from its lower or inner edge, notched to provide an inner inwardly extending angularly arranged sharpened surface 13 and a rounded outwardly extending sharpened surface 13′. The outer edge of the blade, above the curve of the sharpened wall 13′ is also sharpened, as at 14′. This affords positive cutting edges at the said outer, lower and active end of the blade 12, while the rear and elevated end of the blade is rounded upon itself in the direction of the standard 7 as indicated by the numeral 14 whereby the earth cut by the cutting edge of the blade, and traveling over the inclined inner face of the said blade will be directed by the part 14 onto the walk.

Pivotally secured to the standard there is the lower end of the operating lever. The lever comprises two sections, and the lower section 15 is pivoted to the standard. The section 15 is disposed in lapping relation with the other lever section 16, a pivot 17 connecting the sections 15 and 16 and the other section 16 is pivoted, as at 18, to one side of the handle 2 of the mowing machine.

The section 15 has its rear edge, adjacent the pivot 17, notched, as at 19. The section 16 has one of its rear edges formed with an angle finger 20 to be received in the notch 19 when said sections are in longitudinal alinement as disclosed by the full lines in Figure 2 of the drawing.

Swivelly connected to the handle bar 2 of the mowing machine there is a hook 21 and the plate 9 has an apertured ear 22 to receive therethrough the hook 21 when the joint between the lever sections is broken and the said sections swung to the dotted line position in Figure 2, such swinging of the lever raising the standard 7 and the shovel or blade 12 carried by the standard. The brace 5 is removed from the ears 4 and 6 when the device is swung to inoperative position but when the device is moved to said operative position, the brace rod 5 is necessarily employed for holding the structure rigid. The hook 21 also serves as a support for a basket into which is gathered cut grass, etc.

As disclosed by Figure 5 of the drawing the gage 10 limits the depth of the trench made by the blade 12 and in digging the trench the weight of the lawn mower serves to balance and hold the cutter blade 12 from lateral canting or tilting movement. It is thought the foregoing description when read in connection with the accompanying drawing will fully and clearly set forth my improvement, its construction, operation and advantages so that further detailed description will not be required.

Having described the invention, I claim:

1. An attachment for hand propelled lawn mowers comprising a standard pivotally secured to the handle of a mower, a gage plate on the outer end of the standard, a cutting blade supported below the gage plate, a lever pivotally secured to the standard and to the mower handle, said lever comprising two pivotally associated sections, elements on the sections for holding said sections in alinement when the standard and cutting blade are in operative position, said elements designed to be brought away from each other when the lever sections are broken upon the standard and blade being elevated by said lever, and means carried by the mower handle to engage the standard for holding the attachment elevated.

2. An attachment for a lawn mower comprising a standard pivotally secured to the handle of a mower, an angle plate affording a depth gage fixed to the outer end of the standard and having a depending portion, a cutting blade secured to said depending portion at an angle to the horizontal, said blade comprising an angularly arranged member having its front lower end beveled and sharpened and its rear elevated end rounded in the direction of the standard, removable brace means to engage the standard and handle when the cutting blade is in cutting position, a lever pivotally secured to the handle and to the standard, said lever comprising two pivotally associated sections, an offset finger extending from the edge of one of the sections to engage with the other lever section for holding the sections in alinement when the standard and cutting blade are in operative positions, said finger being designed to be brought away from the lever section engaged thereby when the lever sections are broken when the standard and blade are elevated by said lever, and a hook carried by the handle of the mower to engage with the standard for holding the attachment elevated.

3. A lawn mower attachment comprising a gage plate having an outer downwardly extending flange, a cutting blade fixed on the lower edge of the flange, and being disposed at an angle to both the longitudinal and horizontal lateral axes of the flange, said blade having its forward lower end formed from its juncture line with the flange with an arcuate slot whose wall, together with the remaining portion of the front edge is sharpened, said blade having its rear and elevated portion extending beyond the flange and gage plate but rounded towards these elements, and means for pivotally supporting the gage plate and cutting blade on a lawn mower in either operative or inoperative positions.

In testimony whereof I affix my signature.

SAMUEL J. HINES.